United States Patent [19]

Drüeke: Stefan et al.

[11] Patent Number: 5,453,449

[45] Date of Patent: Sep. 26, 1995

[54] COATING COMPOSITION AND THE USE THEREOF IN THE PRODUCTION OF COATINGS WITH A RAPIDLY WORKABLE SURFACE

[75] Inventors: Drüeke: Stefan; Carmen Flosbach; Walter Schubert, all of Wuppertal, Germany

[73] Assignee: Herberts Gesellschaft Mit BeschGankter Haftung, Germany

[21] Appl. No.: 94,462

[22] Filed: Jul. 20, 1993

[30] Foreign Application Priority Data

Jul. 30, 1992 [DE] Germany ............ 42 25 105.2

[51] Int. Cl.⁶ ................ C08F 2/46; C08F 8/30; C08J 3/00
[52] U.S. Cl. ............ 522/6; 522/7; 522/8; 524/592; 524/606; 525/257; 525/374; 427/496; 427/500
[58] Field of Search .................... 524/592, 606; 525/257, 302, 305, 374, 424, 426, 530, 532; 528/36, 114, 117, 126, 130; 522/6, 7, 8; 526/321, 323.1; 427/496, 500

[56] References Cited

U.S. PATENT DOCUMENTS

| | | | |
|---|---|---|---|
| Re. 30,772 | 10/1981 | Friedlander et al. | 525/421 |
| 2,759,913 | 8/1956 | Hulse . | |
| 4,303,563 | 12/1981 | Emmons et al. | 525/257 |
| 5,159,024 | 10/1992 | Brindöpke et al. | 525/302 |
| 5,169,979 | 12/1992 | Kubillus et al. | 560/176 |
| 5,178,952 | 1/1993 | Yamamoto et al. | 522/96 |

FOREIGN PATENT DOCUMENTS

| | | |
|---|---|---|
| 0227454 | 7/1987 | European Pat. Off. . |
| 0231442 | 7/1987 | European Pat. Off. . |

Primary Examiner—Yoon: Tae H.
Attorney, Agent, or Firm—Merchant Gould Smith Edell Welter & Schmidt

[57] ABSTRACT

Coating composition suitable for use in the production of coatings with a rapidly curable surface containing A) 10–80 wt. % of one or more compounds with on average at least two CH-acid hydrogen atoms, B) 10–80 wt. % of one or more α,β-unsaturated compounds with at least two identical or different groups of the general formula $R_1R_2C=CR_3$—CO— which are linked together by the residue of a di-or polyhydric alcohol, a di- or polyamine or aminoalcohol, in which $R_1$, $R_2$ and $R_3$ are mutually independently a hydrogen atom or a straight or branched alkyl residue with 1 to 10 carbon atoms, which residue may be olefinically mono- or polyunsaturated and/or may have one or more hydroxyl groups, C) 0–50 wt. % of one or more radically or ionically polymerisable compounds, D) 5–50 wt. % of one or more polyamines with at least two amine functional groups, related to the sum of the weights of A), B) and C), which may be primary and/or secondary and which may be entirely or partially capped, per molecule, E) 0.01–5 wt % related to the sum of the weights of components A), B), C) and D) of a catalyst in the form of one or more Lewis or Brønsted bases, wherein the conjugate acids of the latter have a pKA value of at least 10, F) 0.1 to 10 wt. %, related to the sum of the weights of components A), B), C) and D) of one or more photoinitiators, together with pigments and/or extenders, optionally together with auxiliary substances and additives customary in lacquers and optionally one or more organic solvents and/or water.

13 Claims, No Drawings

COATING COMPOSITION AND THE USE THEREOF IN THE PRODUCTION OF COATINGS WITH A RAPIDLY WORKABLE SURFACE

The invention relates to coating composition formulations, which give rise to coatings with a rapidly workable surface. They are particularly suitable as formulations for fillers and surfacing compounds.

Coating compositions based on CH-acid compounds and olefinically unsaturated compounds are known. For example, two component lacquers containing such components are described in EP-A-0 224 158. These two component lacquers are heat curable; the curing reaction is catalysed by Lewis and/or Brønsted bases. In EP-A-0 227 454, acetoacetate polymers are described as crosslinking agents for acryloyl-unsaturated acrylates. Such systems are suitable for the production of various coatings.

In the production of coatings, particularly multilayer coatings in the automotive sector, it is often necessary to form layers, the surface of which is rapidly curable in order to allow an intermediate treatment, such as sanding. Such layers are in particular produced from surfacing or filler compounds. It is known in the literature to use a so-called double-cure system to produce such layers, which system may be initially cured by UV radiation and subsequently thoroughly cured conventionally by heating. Such a system is described in EP-A-0 247 563; this is a two component system comprising a radiation-curable oligomer with at least two (meth)acrylate groups, an OH-functional polymer, a polyisocyanate, light stabilisers and photoinitiators. The use of toxicologically questionable polyisocyanates is, however, a considerable disadvantage of these coating compositions. EP-A-0 245 639 describes the production of stable, scratch resistant and solvent resistant coatings which contain opaque pigments. In addition to an unsaturated polyester, the system contains cellulose nitrate, pigments, hydroperoxides, driers and photoinitiators, wherein the use of peroxides has attendant risks. Even thicker layers of the systems are intended to be radiation curable.

The object of the invention is to provide coating compositions which produce coatings with a rapidly workable surface which may be formulated without toxicologically questionable polyisocyanates and require no peroxides. Mechanically and chemically stable surfaces are intended to be achieved.

It has been found that this object may be achieved with a coating composition which contains:

A) 10–80 wt. % of one or more compounds with on average at least two CH-acid hydrogen atoms as crosslinking agent, B) 10–80 wt. % of one or more α,β-unsaturated compounds with at least two identical or different groups of the general formula

which are linked together by the residue of a di- or polyhydric alcohol, a di- or polyamine or aminoalcohol, in which $R_1$, $R_2$ and $R_3$ are mutually independently a hydrogen atom or a straight or branched alkyl residue with 1 to 10 carbon atoms, which residue may be olefinically mono- or polyunsaturated and/or may have one or more hydroxyl groups, C) 0–50 wt. % of one or more radically or ionically polymerisable compounds, D) 5–50 wt. % of one or more polyamines with at least two amine functional groups, related to the sum of the weights of A), B) and C, which may be primary and/or secondary and which may be entirely or partially capped, per molecule, E) 0.01–5 wt. %, related to the sum of the weights of components A), B), C) and D), of a catalyst in the form of one or more Lewis or Brønsted bases, wherein the conjugate acids of the latter have a pKA value of at least 10, F) 0.1 to 10 wt % related to the sum of the weights of components A), B), C) and D), of one or more photoinitiators, optionally together with pigments and/or extenders, optionally together with auxiliary substances and additives customary in lacquers and optionally one or more organic solvents and/or water.

According to the invention, the CH-acid crosslinking agents used as component A) in the coating compositions according to the invention are those containing at least two CH-acid hydrogen atoms. These may, for example, originate from one or more of the following groupings, which may be the same or different:

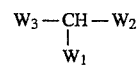

in which

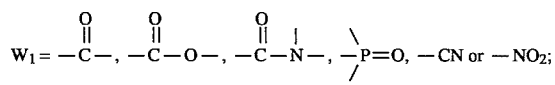

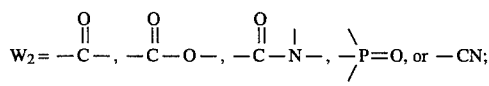

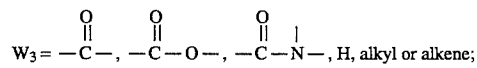

wherein the carboxyl or carbonamide groups defined above for the residues $W_1$, $W_2$ and $W_3$ are each bonded to the CH group via the carbon atom and the CH group is bonded via at least one of the residues $W_1$, $W_2$ and/or $W_3$ to a polymeric or oligomeric unit. The CH-acid functionality of component A) is on average $\geq 2$ per molecule. Therefore, if $W_3$ in the above general formula means a hydrogen atom, then such a group is sufficient since the group has two acid hydrogen atoms.

As previously mentioned, the CH-acid functionality of component A) is on average $\geq 2$. This means that monofunctional molecules may also be used mixed with higher-functional molecules.

Those CH-acid crosslinking agent compounds are preferred which are substantially free of primary, secondary or tertiary amino groups, as these can have a negative influence on storage stability and light stability.

Listed below are examples of CH-acid crosslinking compounds A which fall within the above general formula. These examples are subdivided below into three groups A1, A2 and A3.

In group A1, on average at least two groups with active H atoms of the type

are contained in each molecule, which groups are derived from methanetricarboxylic acid monoamide units or acetoacetic acid ester-2-carboxylic acid amides.

Suitable compounds A1 are, for example, reaction products of malonic acid diesters such as dimethyl, diethyl, dibutyl, dipentyl malonate or acetoacetic acid esters such as methyl, ethyl, butyl or pentyl acetoacetate with polyisocyanates.

Examples of polyisocyanates usable for this purpose are aliphatic, cycloaliphatic or aromatic polyisocyanates with at least two isocyanate groups, such as tetramethylene diisocyanate, hexamethylene diisocyanate, 2,2,4-trimethylhexamethylene diisocyanate, 1,12-dodecane diisocyanate, cyclohexane-1,3 and -1,4 diisocyanate, 1-isocyanato- 3,3,5-trimethyl-5-isocyanato-methylcyclohexane (= isophorone diisocyanate, IPDI), perhydro-2,4'- and/or -4,4'-diphenylmethane diisocyanate, 1,3- and 1,4-phenylene diisocyanate, 2,4- and 2,6-tolylene diisocyanate, diphenylmethane-2,4' and/or -4,4' diisocyanate, 3,2'- and/or 3,4-diisocyanato-4-methyl-diphenylmethane, naphthylene-1,5 diisocyanate, triphenylmethane-4,4'-4" triisocyanate, tetramethylxylylene diisocyanate or mixtures of these compounds.

Apart from these simple isocyanates, those isocyanates containing heteroatoms in the residue linking the isocyanate groups are also suitable. Examples of these are polyisocyanates having carbodiimide groups, allophanate groups, isocyanurate groups, urethane groups, acylated urea groups and biuret groups.

Particularly well suited to the reaction are the known polyisocyanates which are mainly used in lacquer production, for example modification products of the above-stated simple polyisocyanates containing biuret, isocyanurate or urethane groups, in particular tris-(6-isocyanatohexyl)-biuret or low molecular weight polyisocyantes with urethane groups, as may be obtained by the reaction of an excess of IPDI with simple polyhydric alcohols of the molecular weight range 62–300, particularly with trimethylolpropane. Naturally, any desired mixtures of the stated polyisocyanates may also be used for the production of crosslinking component A1.

Further suitable polyisocyanates are the known prepolymers having terminal isocyanate groups, as are in particular accessible by the reaction of the above-stated simple polyisocyanates, principally diisocyanates, with substoichiometric quantities of organic compounds with at least two groups capable of reacting with isocyanate groups. The compounds used to this end are preferably any such compounds having at least two amino groups and/or hydroxyl groups with a number average molar mass of 300 to 10,000, preferably 400 to 6,000. It is preferably the corresponding polyhydroxyl compounds which are used, for example the hydroxypolyesters, hydroxypolyethers and/or acrylate resins containing hydroxyl groups which are known per se in polyurethane chemistry.

In these known prepolymers, the ratio of isocyanate groups to hydrogen atoms reactive with NCO is 1.05 to 10:1, preferably 1.1 to 3:1, wherein the hydrogen atoms preferably originate from hydroxyl groups.

The type and quantity ratios of the starting materials used in the production of the NCO prepolymers are furthermore preferably selected such that the NCO prepolymers have a) an average NCO functionality of 2 to 4, preferably from 2 to 3 and b) a number average molar mass of 500–10,000, preferably from 800–4,000 g/mol.

Suitable compounds A1 are also, however, the reaction products of esters and partial esters of polyhydric alcohols of malonic acid with monoisocyanates. Polyhydric alcohols are, for example, di- to pentahydric alcohols such as ethanediol, the various propane-, butane-, pentane- and hexanediols, polyethylene and polypropylene diols, glycerol, trimethylolethane and -propane, pentaerythritol, hexanetriol and sorbitol. Suitable monoisocyanates are, for example, aliphatic isocyanates such as n-butyl isocyanate, octadecyl isocyanate, cycloaliphatic isocyanates such as cyclohexyl isocyanate, araliphatic isocyanates such as benzyl isocyanate or aromatic isocyanates such as phenyl isocyanate.

Also suitable are the corresponding malonic esters of acrylic resins, polyesters, polyurethanes, polyethers, polyester amides and imides containing OH groups, and/or reaction products of malonic acid semi-esters such as malonic acid monoethyl ester with aliphatic and aromatic epoxy resins, for example acrylate resins containing epoxy groups, glycidyl ethers of polyols such as hexanediol, neopentyl glycol, diphenylolpropane and -methane and hydantoins containing glycidyl groups, together with mixtures of these compounds.

The examples of the following group A2 exhibit a suitable curing component with active CH groups, which component contains as least two groups of the formula (I)

 (I)

or structural units of the formulae (I') or (I")

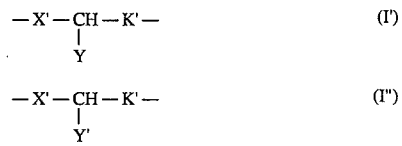

in which:

K means

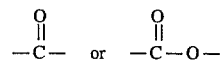

wherein the latter group is bonded to the CH group via the C atom;

X and Y are the same or different and are

—$CO_2R^1$, —CN, —$NO_2$, —$CONH_2$, —$CONR^1H$ or —$CONR^1R^1$, wherein the residues $R^1$ may be the same or different and stand for a hydrocarbon residue, preferably an alkyl residue with 1 to 12, preferably 1 to 6 C atoms, which residue may also be interrupted by oxygen or an N-alkyl residue, with the proviso that only one of the two residues X, Y can represent the NO$_2$ group;

K' means

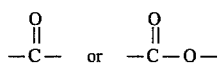

wherein the latter group is bonded to the CH group via the C atom;

X' and Y' are the same or different and mean

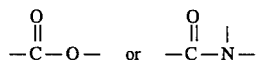

with the proviso that, if K' and X' simultaneously mean

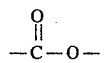

the residue Y' preferably does not mean

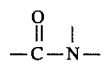

The number of (I) groups in the curing agent according to the invention is preferably 2 to 200 and in particular 2 to 10, wherein the higher numbers refer to oligomeric or polymeric products, in which case they are averages as mixtures may be present.

The curing component A2 usable according to the invention preferably has the formula (II)

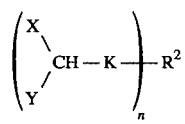

in which X, Y and K have the above meaning, R² represents the residue of a polyol

or the residue R² of a polycarboxylic acid

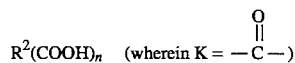

and n means at least 2, preferably 2 to 200, in particular to 10. In the case of oligomeric or polymeric curing components these figures are again average values.

Also preferred are curing components coming within group A2 which are obtained by transesterification of compounds of the formula (III) or the formula (IV)

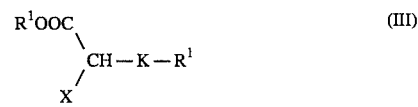

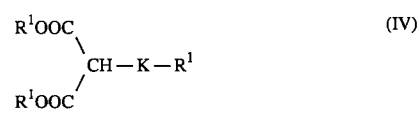

with polyols R²(OH)$_n$, wherein X, K and R¹ have the above meaning.

The above-stated polyols R²(OH)$_n$ may be a polyhydric alcohol, preferably containing 2 to 12, in particular 2 to 6 C atoms. Examples of such polyols are: ethylene glycol, (1,2)- and (1,3)-propylene glycol, (1,4)- and (2,3)-butylene glycol, di-β-hydroxyethylbutanediol, (1,6)-hexanediol, (1,8)-octanediol, neopentyl glycol, (1,6)-cyclohexanediol, 1,4-bis-(hydroxymethyl)-cyclohexane, 2,2-bis-(4-hydroxycyclohexyl)-propane, 2,2-bis-(4-(β-hydroxyethoxy)phenyl)-propane, 2-methyl-1,3-propanediol, glycerol, trimethylolpropane, (1,2,6)-hexanetriol-( 1,2,4)-butanetriol, tris-(β-hydroxyethyl)-isocyanurate, trimethylolethane, pentaerythritol and their hydroxyalkylation products, together with diethylene glycol, triethylene glycol, tetraethylene glycol, polyethylene glycols, dipropylene glycol, tripropylene glycol, polypropylene glycols, dibutylene glycol, polybutylene glycols and xylylene glycol. Those polyesters may also be used which are obtained from or with lactones, for example ε-caprolactone or hydroxycarboxylic acids, such as for example hydroxypivalic acid, ω-hydroxydecanoic acid, ω-hydroxycaproic acid, thioglycolic acid. In such polyhydric alcohols the index n in the above formula (II) preferably stands for 2 to 4.

Alternatively, the polyol may be an oligomeric or polymeric polyol compound (polyol resin), the number average molecular weight of which, M$_n$ (determined by gel chromatography; polystyrene standard), is customarily in the range from approximately 170 to approximately 10,000, preferably approximately 500 to approximately 5,000. In special cases, the number average molecular weight may, however, be 10,000 and over. Polymers, polycondensates or polyaddition compounds may here be considered as oligomers/polymers. The hydroxyl value is generally 30 to 250, preferably 45 to 200 and in particular 50 to 180 mg KOH/g. The compounds containing OH groups may optionally contain further functional groups, such as carboxyl groups.

Examples of such polyols are polyether polyols, polyacetal polyols, polyesteramide polyols, polyamide polyols, epoxy resin polyols or their reaction products with CO$_2$, phenolic resin polyols, polyurea polyols, polyurethane polyols, cellulose ester and ether polyols, partially saponified vinyl ester homo- and copolymers, partially acetalised polyvinyl alcohols, polycarbonate polyols, polyester polyols or acrylate resin polyols. Polyether polyols, polyester polyols, acrylate resins and polyurethane polyols are preferred. Such polyols, which may also be used mixed together, are, for example, described in DE-OS 31 24 784.

Examples of polyurethane polyols are produced from the reaction of di- and polyisocyanates with an excess of diols and/or polyols. Suitable isocyanates are, for example, hexamethylene diisocyanate, isophorone diisocyanate, tolylene diisocyanate together with isocyanurates, formed from three moles of a diisocyanate such as hexamethylene diisocyanate or isophorone diisocyanate and biurets produced from the reaction of three moles of a diisocyanate with one mole of water. Suitable polyurea polyols may be obtained in a similar manner by the reaction of di- and polyisocyanates with equimolar quantities of amino alcohols, for example ethanolamine or diethanolamine.

Examples of polyester polyols are the known polycondensates prepared from di- or polycarboxylic acids or their anhydrides, such as phthalic anhydride, adipic acid etc., and polyols such as ethylene glycol, trimethylolpropane, glycerol etc.

Suitable polyamide polyols may be obtained in a similar manner as the polyesters, by at least partially replacing the polyols with polyamines, such as isophorone diamine, hexamethylene diamine, diethylene triamine etc.

Examples of polyacrylate polyols or polyvinyl compounds containing OH groups are the known copolymers prepared from (meth)acrylic acid esters containing hydroxyl groups or vinyl alcohol and other vinyl compounds, such as for example styrene or (meth)acrylic acid esters.

The above polycarboxylic acids $R^2(CO_2H)_n$, wherein n is here preferably 2 to 4, may be of an aliphatic, cycloaliphatic, aromatic and/or heterocyclic nature and optionally substituted and/or saturated, for example with halogen atoms. The following are stated as examples of such carboxylic acids and their derivatives: succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, di- and tetrachlorophthalic acid, endomethylenetetrahydrophthalic acid and its hexachloro derivative, 1,4- and 1,3-cyclohexanedicarboxylic acid, glutaric acid, maleic acid, fumaric acid, dimeric and trimeric fatty acids, such as oleic acid, optionally mixed with monomeric fatty acids or cyclic monocarboxylic acids, such as benzoic acid, p-tert-butylbenzoic acid or hexahydrobenzoic acid. Together with the reaction products of the above-stated polyols $R^2(OH)_n$ with cyclic carboxylic acid anhydrides.

The curing component A2 which may be used according to the invention comprises, depending on the type of polyol or polycarboxylic acid component, higher or lower viscosity liquids or solids, which are largely soluble in at least customary lacquer solvents and preferably contain less than 5 wt. %, in particular less than 1 wt. %, of crosslinked components. The CH equivalent weight, which is an indication of the quantity of groups (I) or structural units (I')/(I'') in (A2), is generally between 100 and 5,000, preferably 200 and 2,000 and the number average molecular weight $M_n$ is as a rule between 200 and 10,000, preferably between 500 and 5,000 (determined by gel chromatography; polystyrene standard). Processes for the production of such compounds are described in more detail in EP-A-0 310 011.

Further examples of curing agent components usable according to the invention are those of type A3, in which the CH grouping is derived from a compound with the grouping —CO—CHR³—CO—, NC—CHR³—CO—, NC—CH₂—CN, =PO—CHR³—CO—, =PO—CHR³CN, =PO—CHR³—PO=, —CO—CHR³—NO₂, in which R³ is $C_1$–$C_8$ alkyl, H, preferably hydrogen. β-dioxo compounds are preferred.

The above A3 groupings may be bonded to at least one polyvalent monomeric or polymeric compound. They may, for example, be bonded to at least one compound from the group of mono- or polyhydric alcohols, polymers, polyamines and polymercaptans containing OH groups. The compounds are polyvalent in relation to the CH functional group. They may thus, for example, be produced by esterification of a polyepoxide with a —CH carboxylic acid which forms the grouping, for example cyanoacetic acid. In this manner, a component A3 is obtained with two active H atoms per epoxy group. Aromatic or aliphatic polyepoxides may be used in this instance.

Suitable examples of compounds of the type A3 are ketones, such as acetylacetone, benzoylacetone, acetyldibenzoylmethane, together with esters of, optionally alkyl-substituted, acetoacetic acid such as α- and/or γ-methylacetoacetic acid, or of acetone dicarboxylic acid, malonic acid units with an ester-type linkage of malonic acid and its monoalkyl derivatives, straight chain or branched, with 1 to 3 C atoms in the alkyl residue, for example methyl, ethyl and n-butyl or also phenyl, or of cyanoacetic acid with mono- to hexahydric alcohols with 1 to 10 C atoms. The alkyl-substituted esters, for example α-methyl or α,γ-dimethylacetoacetic ester, have only one active H atom and are therefore preferably used in the form of di- or polyesters of polyhydric alcohols in order to have a sufficient number of reactive groups available. Suitable alcohols for the esterification of the above acids are, for example, methanol, ethanol, butanol, octanol and/or, and this is preferred, polyhydric alcohols or polyhydroxy compounds. Further examples of A3 are, for example, acetoacetic ester, ethanediol bisacetoacetic ester, glycerol tris-malonic acid ester, trimethylolpropane tris-acetoacetic ester, partial esters of these acids with polyhydric alcohols, together with corresponding esters of acrylic resins, polyesters, polyethers, polyester amides and imides containing OH groups, polyhydroxylamines, together with nitriles of these acids, to the extent that they exist, for example malonic acid mono- or dinitrile, alkoxycarbonyl-methanephosphonic acid ester and the corresponding bis-methanephosphonic acid ester. The above-stated acids may also be bonded in the form of amides to amines, preferably polyamines, which also include oligomers and/or polymers including amine resins, wherein aliphatic amines are preferred.

If polyamines are the starting material, compounds A3 may be produced in the form of amides. Thus, for example, it is possible to start from 1 mole of an alkene diamine which is reacted with 2 moles of acetoacetic ester to a form a compound which also has four H atoms activated by amide groups.

Reactive nitro compounds are suitable compounds for A3, for example nitroacetic acid derivatives, such as tris-(nitroacetic acid)-glycerol ester or trimethylolpropanenitroacetic acid ester.

Among the compounds for A3 which form groups of the type —CH—, diketene and its mono-α-alkyl substitution products, together with tetrahydrodioxin, should be mentioned, which may react with suitable components to form acetoacetic ester or amide groups.

The curing agent components A may be produced in customary solvents. It is favourable to use solvents which will not later disrupt production of the coating composition. It is also favourable to keep the content of organic solvents as low as possible. If the curing agent component A contains polar groups, for example amide or urethane groupings, it may be readily dispersed in water. This may optionally also be promoted by the crosslinking components' containing neutralisable ionic groups, for example carboxyl groups, in the oligomer or polymer skeleton. Such crosslinking agents with ionic groups may be readily dispersed in water. In this manner, the content of organic solvents may be reduced to low levels without substantially increasing the viscosity of the crosslinking agent solution.

The binder compositions according to the invention may also contain 2-acetoacetoxy-ethylmethacrylate as a reactive diluent to adjust viscosity.

A compound is used in the binder compositions according to the invention as a further binder component B), which compound has at least two unsaturated groups of the general formula (V) $R_1R_2C=CR_3-CO-$, in which $R_1$, $R_2$ and $R_3$ are defined as in the claims. These groups may be bonded together via short or long chain residues, oligomers and/or polymers of di- or polyhydric alcohols, di- or polyamines or aminoalcohols, wherein these oligomers and polymers may, for example, have a number average molecular weight $M_n$ of 100 to 10,000 g/mol. Oligomers and polymers which may, for example, be considered are saturated and/or unsaturated polyethers, polyesters or polyurethanes containing two or more hydroxyl groups, for example those based on maleic acid, phthalic acid and diols, acrylic resins containing hydroxyl groups, aliphatic or preferably aromatic epoxy resins, optionally containing hydroxyl groups, for example those based on diphenylolpropane and/or diphenylolmethane, hydantoin and/or amine resins. The residue of the general formula (V) may here be bonded with an ester-type linkage, for example by the reaction of glycidyl (meth)acrylate with carboxyl groups from acid-functional polyethers, polyesters, polyurethane acrylates, poly(meth)acrylates or by addition of acrylic or methacrylic acid or their derivatives onto epoxy resin epoxy groups or by esterification of polyol hydroxyl groups. Suitable polyhydric alcohols are, for example, alkanediols, the various propane, butane, hexane and octane diols, or their homologues, the corresponding oligomeric ethers, together with glycerol, trimethylolpropane, hexanetriol, pentaerythritol, dipentaerythritol, sorbitol and polyvinyl alcohol together with ethoxylated and propoxylated variants.

The groups of the general formula (V) may be bonded via NH groups and/or OH groups to polyamines with at least two NH groups or at least one NH group and at least one OH group. Starting compounds containing NH groups for such compounds which may be stated are, for example, di- and polyamines, such as alkene diamines and their oligomers, such as ethylenediamine, propylenediamine, diethylenetriamine, tetramines and higher homologues of these amines, together with aminoalcohols such as diethanolamine or the like. Amines which may be considered are also, for example, aminocarboxylic acid esters of polyhydric alcohols. Compounds containing NH groups which may be considered are, for example, acrylic or methacrylic acid polyamides, together with polyurethanes, for example polyisocyanates, which are capped in the form of polyurethane groups, such as those obtained by the reaction of hydroxyethylacrylate with polyisocyanates, amine resins such as methoxymelamines, preferably hexamethylol melamine, urea resins, wherein the residue of the general formula (V) is bonded with the —CO— grouping to the amine groups of these compounds as an amide. If these amine compounds have OH groups or hydroxyalkyl groups, it is also possible that the residue of the formula (V) is bonded with an ester-type linkage or instead via an ether group to these compounds. Starting material for ether bonding of the residue of the formula (V) may be a hydroxyalkyl ester or a hydroxyalkyl amide of an unsaturated acid such as acrylic acid.

The residue of the general formula (V) in component B) may be derived from a mono- or polyunsaturated monocarboxylic acid, for example with 2 to 10, preferably 3 to 6 carbon atoms, such as cinnamic acid, crotonic acid, citraconic acid, mesaconic acid, dihydrolaevulinic acid, sorbic acid, preferably acrylic acid and/or methacrylic acid.

It is also possible to use adducts prepared from copolymers of the compound α-dimethyl-m-isopropenylbenzoisocyanate (called m-TMI in the remainder of the text) with hydroxy(meth)acrylic monomers. The comonomers which may be used for copolymerisation with m-TMI are, for example, customary (meth)acrylic acid esters, as have already been mentioned in the explanations concerning the polyols. Possible hydroxy(meth) acrylic monomers for adduct formation with m-TMI copolymers are, for example, hydroxyethyl (meth)acrylate, hydroxypropyl (meth)acrylate or butanediol monoacrylate. It is also possible to use addition products of hydroxyethyl methacrylate onto caprolactone.

Examples of component B are hexanediol di(meth)acrylate and dipropylene glycol di(meth)acrylate and examples of tri- and tetrafunctional monomers are trimethylolpropane tri(meth)acrylate and pentaerythritol tri- or tetra(meth)acrylate, together with ethoxylated and propoxylated variants.

Examples of oligomers or prepolymers are (meth)acrylic functional (meth)acrylic polymers, epoxy resin (meth)acrylates, for example reaction products prepared from 2 moles of (meth) acrylic acid and commercial epoxy resins, such as for example Epicote® 828, polyester (meth)acrylates, amine (meth)acrylates, unsaturated polyesters, unsaturated polyurethanes, silicone (meth)acrylates or combinations thereof.

The term (meth)acrylic used in this specification means acrylic and/or methacrylic.

Component B) may contain no solvents or it may, however, contain residual solvent from its production, for example aliphatic and/or aromatic hydrocarbons. Solids content may be adjusted to desired values, for example by removing residual solvent, for example by distillation or by the addition of water or solvents which are required for the subsequent preparation of coating compositions and are described below. The same solvent is preferably used as for component A).

The coating compositions according to the invention may also contain as component C) in the binder component additional materials curable by high-energy radiation, which may be monomers, oligomers or polymers or copolymers. They are subject to no restrictions. They may be both radically and ionically polymerisable compounds. Radically polymerisable compounds are preferred, wherein these may also favourably be present as a mixture with ionically polymerisable compounds.

Examples of radically polymerisable compounds are customary radiation curable compounds, which are in particular used in UV-curable lacquers, based on monomers, oligomers, polymers, copolymers or combinations thereof with one or more olefinic double bonds, such as, for example, acrylic acid and methacrylic acid esters. Examples of monofunctional monomers are butyl (meth)acrylate and hydroxyethyl (meth) acrylate. Examples of difunctional monomers are diacrylates, as were listed above as examples for component B).

Vinyl compounds may, however, also be present as monomers. These may be mono- and/or polyfunctional monomers. Examples of monofunctional monomers are hydroxybutyl vinyl ether, styrene, N-vinylpyrrolidone. Examples of polyfunctional monomers are butanediol divinyl ether, cyclohexane divinyl ether.

Component D) in the binder composition is a polyamine component with at least two functional groups of the formula

in which $R^4$ may be a hydrogen atom or a straight or branched alkyl residue with 1 to 10 carbon atoms or cycloalkyl residue with 3 to 8, preferably 5 or 6, carbon atoms.

Suitable polyamines are diamines and amines with more than two amino groups, wherein the amino groups may be primary and/or secondary. Furthermore, suitable polyamines are also, for example, adducts consisting of polyamines with at least two primary amino groups and at least one, preferably one, secondary amino group with epoxy compounds, polyisocyanates and acryloyl compounds. Furthermore, those aminoamides and adducts having at least two amino groups and prepared from carboxy-functionalised acrylates with imines are also suitable.

Examples of suitable di- and polyamines are, for example, described in EP-A-0 240 083 and EP-A-0 346 982. Examples of these are aliphatic and/or cycloaliphatic amines with 2 to 24 C atoms which contain to 2 to 10 primary amino groups, preferably 2 to 4 primary amino groups and 0 to 4 secondary amino groups. Representative examples of these are, ethylenediamine, propylenediamine, butylenediamine, pentamethylene diamine, hexamethylenediamine, 4,7-dioxa-1,10-decanediamine, 1,2-diaminocyclohexane, 1,4-diaminocyclohexane, isophoronediamine, diethylenetriamine, dipropylenetriamine, 2,2-bis-(4-aminocyclohexyl)propane; polyether polyamines, for example those with the trade name Jeffamines from Jefferson Chemical Company, bis-(3-aminopropyl)ethylamines, 3-amino-1-(methylamino)propane and 3-amino-1(cyclohexylamino)propane.

Examples of usual polyamines based on adducts of polyfunctional amine components with di- or polyfunctional epoxy compounds are those which are produced using, for example, di- or polyfunctional epoxy compounds, such as diglycidyl or polyglycidyl ethers or (cyclo)aliphatic or aromatic hydroxy compounds such as ethylene glycol, glycerol, 1,2- and 1,4-cyclohexanediol, bisphenols such as bisphenol A, polyglycidyl ethers of phenolformaldehyde novolaks, polymers of ethylenically unsaturated groups containing epoxy groups, such as glycidyl (meth)acrylate, N-glycidyl (meth)acrylamide and/or allylglycidyl ether, optionally copolymerised with various other ethylenically unsaturated monomers, glycidyl ethers of fatty acids with 6 to 24 C atoms, epoxidised polyalkadienes, such as epoxidised polybutadiene, hydantoin-epoxy resins, resins containing glycidyl groups, such as polyesters or polyurethanes, which contain one or more glycidyl groups per molecule and mixtures of the stated resins and compounds.

Addition of the polyamines to the stated epoxy compounds proceeds by ring opening of the oxirane grouping. The reaction may, for example, proceed within a temperature range from 20°–100° C., preferably however between 20°– 60° C. The reaction may optionally be catalysed with 0.1 to 2 wt. % of a Lewis base such as triethylamine or an ammonium salt such as tetrabutylammonium iodide.

Customary isocyanates for the production of the polyamine component based on polyamine/isocyanate adducts are aliphatic, cycloaliphatic and/or aromatic di-, tri- or tetraisocyanates, which may be ethylenically unsaturated. Examples of these are 1,2-propylene diisocyanate, trimethylene diisocyanate, tetramethylene diisocyanate, 2,3-butylene diisocyanate, hexamethylene diisocyanate, 2,2,4-trimethylhexamethylene diisocyanate, 2,4,4-trimethylhexamethylene diisocyanate, ω,ω'-dipropylether diisocyanate, 1,3-cyclopentane diisocyanate, 1,2- and 1,4-cyclohexane diisocyanate, isophorone diisocyanate, 4-methyl-1,3-diisocyanate cyclohexane, trans-vinylidene diisocyanate, dicyclohexylmethane-4,4'-diisocyanate, 3,3'-dimethyl-dicyclohexylmethane- 4,4'-diisocyanate, tolylene diisocyanate, 1,3-bis(1-isocyanato-1-methylethyl)-benzene, 1,4-bis(1-isocyanato-1-methylethyl)-benzene, 4,4'-diisocyanatodiphenyl, 3,3'-dichloro- 4,4'-diisocyanatodiphenyl, adducts of 2 moles of a diisocyanate, for example hexamethylene diisocyanate or isophorone diisocyanate, onto one mole of a diol, for example ethylene glycol, the adduct of 3 moles of hexamethylene diisocyanate onto 1 mole of water (available under the trade name Desmodur N from Bayer AG), the adduct of 1 mole of trimethylolpropane and 3 moles of toluidine diisocyanate (available under the trade name Desmodur L from Bayer AG) and the adduct of 1 mole of trimethylolpropane and 3 moles of isophorone diisocyanate.

Addition of the polyamines onto the stated isocyanate compounds preferably proceeds within a temperature range of 20°–80° C., preferably 20°–60° C. The reaction may optionally be catalysed by the addition of 0.1 to 1 wt. % of a tertiary amine, such as triethylamine and/or 0.1 to 1 wt. % of a Lewis acid, such as dibutyltin laurate.

Examples of di- or polyfunctional acryloyl-unsaturated compounds for the production of polyamine adducts are described in U.S. Pat. No. 4,303,563, for example, ethylene glycol diacrylate, diethylene glycol diacrylate, trimethylene glycol diacrylate, 1,3-butylene glycol diacrylate, 1,6-hexamethylene glycol diacrylate, trimethylolpropane diacrylate, pentaerythritol tetraacrylate and pentaerythritol triacrylate. Further examples of polyfunctional acryloyl-unsaturated acrylates are:

1) urethane acrylates, obtained by the reaction of an isocyanate group of a polyisocyanate with a hydroxyacrylate, for example hexamethylene diisocyanate and hydroxyethyl acrylate, production is described in U.S. Pat. No. 3,297,745, 2) polyether acrylates obtained by transesterification of a hydroxy-terminated polyether with acrylic acid, described in U.S. Pat. No. 3,380,831, 3) polyester acrylate, obtained by esterification of a polyester containing hydroxyl groups with acrylic acid, described in U.S. Pat. No. 3,935,173, 4) polyfunctional acrylates, obtained by the reaction of a hydroxy-functionalised acrylate, such as for example hydroxyethyl acrylate with
   a) dicarboxylic acids with 4–15 C atoms,
   b) polyepoxides with terminal glycidyl groups,
   c) polyisocyanates with terminal isocyanate groups, described in U.S. Pat. No. 3,560,237, 5) acrylate-terminated polyesters, obtained by the reaction of acrylic acid, a polyol with at least three hydroxy functional groups and a dicarboxylic acid, described in U.S. Pat. No. 3,567,494, 6) polyacrylate obtained by the reaction of acrylic acid with an epoxidised oil containing epoxy functional groups, such as soya oil or linseed oil, described in U.S. Pat. No. 3,125,592, 7) polyacrylate obtained by the reaction of acrylic acid with epoxy groups of a bisphenol A diglycidyl ether, described in U.S. Pat. No. 3,373,075, 8) polyacrylate obtained by the reaction of acrylic acid with an epoxy-functional vinyl polymer, for example polymers with glycidyl acrylate or vinyl glycidyl ether, described in U.S. Pat. No. 3,530,100, 9) polyacrylate obtained by the reaction of acrylic anhydride with polyepoxides, described in U.S. Pat. No. 3,676,398, 10) acrylate-urethane esters obtained by the reaction of a hydroxyalkyl acrylate with a diisocyanate and a hydroxyl-functionalised alkyd resin, described in U.S. Pat. No. 3,676,140, 11) acrylate-urethane polyesters obtained by the reaction of a polycaprolactone diol or triol with an organic polyisocyanate and with a hydroxyalkyl acrylate, described in U.S. Pat. No. 3,700,634, 12) urethane polyacrylate obtained by the reaction of a hydroxy-functionalised polyester with acrylic acid and a polyisocyanate, described in U.S. Pat. No. 3,759,809.

The acryloyl terminal groups of the di- or polyacrylic monomers or of the polyacrylates from examples 1) to 12) may be functionalised with polyamines. Addition may, for example, proceed within a temperature range of 20°–100° C., preferably at 40°–60° C.

A further method for the synthesis of an amine-functionalised curing agent is described in EP-A-0 002 810. In this case, acrylic acid ester copolymers are amidated with diamines with elimination of alcohol. The reactive group so obtained has the following structure:

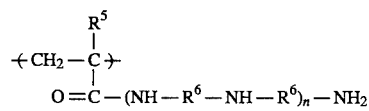

$R^5$=H or $CH_3$
$R^6$=alkene groups with 2 or 3 C atoms, which may be the same or different
n=0, 1, 2 or 3
wherein the residue

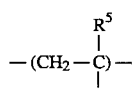

originates from the acrylic acid ester copolymer skeleton.

The acrylic acid ester copolymer has a number average molar weight $M_n$ of 1,000–20,000, preferably 2,000–5,000. Examples of possible comonomers are (meth)acrylic acid esters such as, for example, methyl, ethyl, butyl, cyclohexyl (meth)acrylate, hydroxyethyl (meth)acrylate, hydroxypropyl (meth)acrylate, together with (meth)acrylic acid, styrene and vinyltoluene.

Methyl acrylate is particularly preferred because this monomer is particularly readily accessible to aminolysis. The proportion of methacrylate in the copolymer is 2 to 35 wt. %. Production of the copolymers proceeds by solution polymerisation in customary solvents such as toluene, xylene, acetates, for example butyl acetate or ethyl glycol acetate, ethers such as tetrahydrofuran or blends of aromatics such as the commercial product Solvesso 100. Synthesis of the copolymers is known to the person skilled in the art and requires no further explanation. The polyamines used in the aminolysis must contain at least two primary or secondary amine groups and have already been described above.

Also usable as curing agents are the reaction products from the reaction of a (meth)acrylic acid copolymer with alkene imines, as have been described in EP-A-0 179 954. The functional groups obtained have the structure:

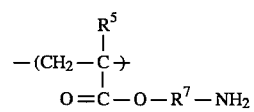

$R^5$=H or $CH_3$
$R^7$=alkene groups with 2 to 4 C atoms
wherein the residue

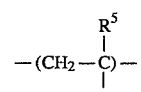

is as previously defined.

The copolymer may be based on other comonomers besides (meth)acrylic acid.

Examples of usable comonomers are α,β-unsaturated monomers, radically polymerisable monomers from the group of esters of α,β-unsaturated carboxylic acids, such as acrylic acid or methacrylic acid, wherein examples of the alcohol component of the esters are methyl, ethyl, propyl alcohol and their isomers and higher homologues. Further examples are diesters of maleic and fumaric acid, wherein the alcohol component is the same as previously mentioned. Further examples are vinyl-aromatic compounds, such as styrene, α-methylstyrene and vinyltoluene. Further examples are vinyl esters of short-chain carboxylic acids, such as vinyl acetate, vinyl propionate and vinyl butyrate.

Examples of alkene imines are, for example, propylene or butylene imine.

Examples of polyamines which may also be used according to the invention as curing agents are those produced by the reaction of copolymers of α-dimethyl-m-isopropenyl-benzyl isocyanate (m-TMI) which have a number average molecular weight ($M_n$) of 1,000 to 10,000, with mono- or diketimines which contain either an OH or a secondary NH grouping.

Comonomers which may be used for the production of the TMI-copolymers are any customary monomers without OH functionality which may undergo vinyl polymerisation, such as, for example, defined above, for example esters of (meth-)acrylic acid, such as for example, methyl, ethyl, butyl, isobutyl, ethylhexyl, cyclohexyl and/or lauryl (methy)acrylate, together with styrene, vinyltoluene and/or α-methylstyrene. Production of the copolymers proceeds by customary radical solution polymerisation, as is known to the person skilled in the art. Polymerisation is, for example, performed in aprotic organic solvents, for example toluene and xylene and esters, for example butyl acetate.

In general, customary free-radical initiators are additionally used, such as peroxides and azo compounds. The reaction proceeds, for example, with heating, for example to temperatures of 80° to 140° C.

The monomeric TMI may be copolymerised within a range of 3 to 40 wt. % related to the weight of all the monomers, preferably, however, within a range of 5 to 25 wt. %.

The isocyanate-terminated copolymer is then reacted with one or more mono- and/or diketimines and/or mono- and/or dialdimines functionalised with OH or secondary NH groups.

Production of the ketimines or aldimines (for simplicity, the term "ketimines" is selected below, but is intended also to include aldimines) proceeds, for example, by the reaction of alkanolamines or di- or triamines which bear at least one primary amino group, in the case of the di- or triamines additionally a secondary amine functional group, with aldehydes and/or ketones with elimination of water.

Examples of alkanolamines are:

monoethanolamine, monopropanolamine, monohexanolamine or 2-amino-2-hydroxypropane.

Examples of di- or triamines, which bear at least one primary amino group and a secondary amino group are:

N-methylpropylamine, diethylenetriamine, dipropylenetriamine or bishexamethyltriamine.

For the production of the TMI-acrylate/ketimine adducts, the primary amino groups in the above-stated amines must be blocked.

To this end, the primary amines are reacted with aldehydes or ketones with elimination of water into Schiff's bases or aldimines or ketimines. Examples of such aldehydes and ketones are:

$C_3-C_{10}$ compounds, such as hexyl aldehyde, octyl aldehyde, diisopropyl ketone and/or methyl isobutyl ketone. Both the latter two compounds are particularly preferred because they display only a slight tendency to secondary reactions.

The OH or secondary NH functionalised mono- or diketimines are preferably used in substoichiometric quantities in the addition onto the isocyanate-terminated copolymer, preferably 90 to 95% of the isocyanate groups are reacted with OH or NH groups. The residual excess isocyanate groups are urethanised in a final reaction stage with monoalcohols, such as for example ethanol, propanol or butanol.

A TMI copolymer is, for example, initially produced by radical solution polymerisation in the synthesis of the ketimine or aldimine functionalised (capped) polyamines. Thereupon, an alkanolamine or di- or triketimine is produced bearing both at least one primary and one secondary amine functional group, and is introduced with the desired aldehyde or ketone blocking agent into an organic solvent which forms an azeotropic mixture with water. By heating this mixture, the liberated water of reaction is azeotropically distilled off.

It is favourable to perform production under inert gas. The blocking agent may be used in excess, and may be distilled off after the reaction. It is convenient to select as capping agent a ketone/aldehyde which itself forms an azeotrope with water, so that an additional organic solvent may be dispensed with. For the addition of the OH or secondary NH functionalised ketimine or aldimine onto the isocyanate-terminated copolymer, the ketimine is introduced into a reaction vessel at, for example, 80° C. under an inert gas atmosphere and the copolymer apportioned over, for example, two hours. The reaction may optionally be catalysed with a Lewis acid, such as for example dibutyltin laurate. On completion of apportionment, if the ketimine is present in excess, an alcohol, for example butanol, is added. The mixture is optionally stirred for a further, for example approximately 10 to 30 minutes, at elevated temperature.

The preceding production method is merely an example of a process. The process may, for example, also be performed in such a manner that the copolymer is initially introduced and the ketimine added.

The terminated (free) amino groups of the polyamine curing agent component D may be capped, for example with ketones or aldehydes, to form Schiff's bases.

All previously described polyamines have very high reactivity with the binder components according to the invention, which results in a very short pot life. For this reason, it may be convenient to react the terminated amine groups of the stated polyamines with aldehydes or ketones with elimination of water to Schiff's bases or aldimides or ketimides. Examples of aldehydes and ketones usable for capping are $C_3-C_{10}$ compounds, such as hexaldehyde, octyl aldehyde, diisopropyl ketone and/or methyl isobutyl ketone.

The latter two compounds are particularly preferred because they display only a slight tendency to secondary reactions.

Component D contains mixed into it catalysts as component E in the form of Lewis bases or Brønsted bases, wherein the conjugate acids of the latter have a pKA value of at least 10. Component E may consist of one or more catalysts. Lewis bases prove to be particularly suitable, such as for example those from the group of cycloaliphatic bases, such as diazabicyclooctane (DABCO), tert.-aliphatic amines, such as triethylamine, tripropylamine, N-methyldiethanolamine, N-methyldiisopropylamine or N-butyldiethanolamine, together with amidines such as diazabicycloundecene (DBU) and guanidines, such as for example N',N',N',N'-tetramethylguanidine. Further examples are alkyl or aryl substituted phosphanes, such as for example tributylphosphane, triphenylphosphane, tris-p-tolylphosphane, methyldiphenylphosphane, together with hydroxy and amino functionalised phosphanes, such as for example tris-hydroxymethylphosphane and tris-dimethylaminoethylphosphane.

Examples of usable Brønsted bases are alkoxides, such as sodium or potassium ethylate, quaternary ammonium compounds, such as alkyl-, aryl- or benzylammonium hydroxides or halides, such as for example tetraethyl- or tetrabutyl ammonium hydroxide or fluoride, together with trialkyl or triaryl phosphonium salts or hydroxides.

The quantity of catalysts is generally 0.01 to 5 wt. % preferably 0.02 to 2 wt. %, related to the total solids content of components A, B, C and D.

The coating compositions according to the invention contain as component F customary photoinitiators, as are used for radical and ionic polymerisation. By way of example, initiators absorbing within the wavelength range of 190 to 400 nm are suitable.

Examples of usable radical initiators are initiators containing chlorine, such as chlorine-containing aromatic compounds, for example described in U.S. Pat. No. 4,089,815; aromatic ketones, as described in U.S. Pat. No. 4,318,791 and EP-A-0161 463; hydroxyalkylphenones, as described in U.S. Pat. No. 4,347,111; water-soluble initiators, for example based on hydroxyalkylphenones, as described in U.S. Pat. No. 4,602,097, unsaturated initiators such as OH-functional aromatic compounds, which have, for example, been esterified with acrylic acid, as described in U.S. Pat. No. 3,929,490, EP-A-0 143 201 and EP-A-0 341 560; or combinations of such initiators, as are, for example, described in U.S. Pat. No. 4,017,652.

Specific examples are 2-methyl-2-hydroxy-propiophenone, benzophenone, thioxanthone derivatives, acylphosphine oxides and Michler's ketone.

Particularly preferred usable radical initiators are phosphine oxides and combinations of phosphine oxides with other customary initiators, as described above.

Examples of usable cationic initiators are triarylsulphonium salts of the general formula

in which aryl represents an aryl residue, such as the phenyl residue, and X⁻ is an anion such as $SbF_6^-$, $PF_6^-$, $AsF_6^-$ and $BF_4^-$, as described in U.S. Pat. No. 4,417,061, EP-A-0 327 194 and DE-A-2 904 626. Further examples of cationic initiators are oxonium salts, iodonium salts and diazonium salts, as are, for example, described in the following references: EP-A-0 464 131, U.S. Pat. No. 4,421,904, EP-A-0 145 633, EP-A-0 310 881, EP-A-0 310 882 (iodonium salts); DE-A-3 808 590 and DE-A-3-808 591 (diazonium salts).

Apart from these initiators, metallocene complexes may also be used, as are, for example, described in EP-A-0 094 915.

The binder compositions according to the invention are so-called two component systems.

Components A, B, C, and F are stored together as binder component 1 and components D and E are stored together as curing agent component 2.

This means that components 1 and 2 are stored separately and are only mixed together just before use or for use, for example, in the production of coating compositions.

The coating composition formulations according to the invention may contain pigments and/or extenders.

Extenders which may be used are, for example, sulphates such as barium sulphate, silicas, such as pyrogenic silicas (aerosils) and silicates, such as talc. Quantities of 10–80 wt. % related to total solids content are preferred for surfacing compounds and fillers.

Pigments which may be used are those customary in lacquers, as are, for example, customary in unsaturated polyester resins. These are customary opaque inorganic or organic pigments such as titanium dioxide, ultramarine blue, iron oxides and phthalocyanine blue.

Further auxiliary substances and additives which may optionally be used are thixotroping agents, smoothing agents, flatting agents and flow-control agents.

The coating composition formulations according to the invention preferably contain no organic solvents, but may contain organic solvents and/or water, for example up to 50 wt. % related to the coating composition formulation.

Suitable organic solvents for the production of coating compositions, for example lacquers, are those as may also be used in the production of the individual components A, B and D. Examples of such solvents are organic solvents such as aliphatic and aromatic hydrocarbons, for example toluene, xylene, mixtures of aliphatic and/or aromatic hydrocarbons, esters, ethers and alcohols. These are customary lacquer solvents. Aqueous solutions may also be prepared for the production of coating compositions from the binders according to the invention. To this end, suitable emulsifiers may optionally be used as are customary in the lacquers sector.

The coating compositions produced from the binders according to the invention may be adjusted to the desired application viscosity by appropriate control of the addition of solvents and/or additives.

Further auxiliary substances and additives which may be added are sensitisers. These are preferably organic aromatic compounds with/without heteroatoms. Examples of aromatic sensitisers without heteroatoms are anthracene and perylene. Examples of aromatic sensitisers with heteroatoms are thioxanthene derivatives, xanthone derivatives and sulphonium complex salts.

Depending on the quantity ratio of component 1 to component 2, equivalent weight and catalyst quantity, the coating compositions may be adjusted to a pot life of between a few minutes and 24 hours.

Application of the coating compositions so produced may proceed in a customary manner, for example by dipping, spraying, brushing or electrostatically. Subsequently, any optionally present solvents or water are vaporised by heat treatment (for example infra-red irradiation or hot air).

The two component coating compositions according to the invention are radiation curable after application and optionally evaporation of solvents. In particular, they are suitable for curing by irradiation with UV radiation or electron beams. Combinations of IR/UV irradiation or IR/electron beam irradiation are also suitable. Radiation sources which may be used are those customary for UV or electron beam irradiation, such as high and medium pressure mercury lamps. In thicker layers, thorough curing subsequently proceeds, for example within a few hours, by Michael addition.

As mentioned, after application to a substrate to be coated, the coating compositions according to the invention may rapidly be superficially cured by irradiation. By way of example, curing of the surface layer up to a depth of 2 mm is possible within 10 minutes. This makes it possible to work the surface immediately, for example by sanding. Thorough curing in thicker layers may proceed during and also after work on the surface.

The coating compositions according to the invention are therefore particularly suitable as surfacing and filler compounds. They have the advantage that they may be formulated without solvents or with only small quantities of solvent. The coating compositions according to the invention may furthermore be formulated such that they contain no toxic constituents, such as for example styrene.

It is naturally also possible to formulate the coating compositions according to the invention without component E and to follow the radiation curing stage with thermal post-treatment at elevated temperatures of, for example, 100°–150° C.

A particularly preferred sector for the use of the binders according to the invention is in the preparation of coating compositions for lacquer coatings in the automotive sector. Due to the favourable curing conditions of coating compositions produced from the binders according to the invention, these coating compositions are also particularly suitable for automotive repair lacquers.

The invention is illustrated with the following examples. All parts and percentages (%) relate to weight.

PRODUCTION EXAMPLE 1

Production of an acetoacetic ester functionalised polyester (component A)

1a) Production of the Polyester 336.7 parts of trimethylolpropane, 366.8 parts of adipic acid and 297 parts of hexanediol are combined with 5 parts of hypophosphorous acid in a 2 liter three-necked flask with stirrer, separator, thermometer and reflux condenser. The mixture is slowly heated from 180° C. in a melt to 230° C., water being separated. The reaction is continued until an acid value of 20 mg KOH/g is reached. The mixture is then condensed under a water-jet vacuum down to an acid value of <1.5 mg KOH/g. The resultant polyester then has an OH value of 466 mg KOH/g and a viscosity of 3200 mPa.s.

1b) Production of an Acetoacetic Functionalised Polyester on the Basis of the Polyester from 1a 1000 parts of the polyester produced under 1a) are introduced into a 4 liter three-necked flask with stirrer, dropping funnel, separator and reflux condenser. To this resin are added 850 parts of acetoacetic ester and 1.5 parts of 98% formic acid and the mixture is heated to 130° C. until a total of 400 parts of distillate have been separated. All volatile constituents are then stripped out under a vacuum. The 98.1% resin obtained then has a viscosity of 3100 mPa.s and a colour value of 65 Hazen.

EXAMPLE 2

Grafted Polyester Resin 2b (component B)

2a) Unsaturated Polyester Resin 140.0 parts of trimethylolpropane, 435.0 parts of neopentyl glycol, 370.0 parts of 1,6-hexanediol together with 409.0 g of tetrahydrophthalic anhydride, 294.0 parts of maleic anhydride, 352.0 parts of phthalic anhydride and 0.8 parts of hydroquinone are weighed out into a reaction vessel fitted with a stirrer, thermometer and distillation column with a water separator on top. After addition of 160 parts of xylene, the mixture is heated under a nitrogen atmosphere. At a maximum temperature of 195° C., water is removed from the system until the acid value is less than 30 mg KOH/g of solid resin. The mixture is then cooled and the distillation column replaced with a distillation bridge. The added xylene is distilled off under a vacuum at 120° C.

Final values: Solids (1 h/150° C.): 99.3%, acid value: 29.2 mg KOH/g solid resin Viscosity: highly viscous, colour value (Gardner): 2–3

2b) Grafting of 1a) with Glycidyl Methacrylate

In a reaction vessel with a stirrer, thermometer and reflux condenser, 2000.0 parts of polyester resin 1a) are combined with 126.6 parts of glycidyl methacrylate and 4.2 parts of triphenylphosphine and heated to 120° C. under a nitrogen atmosphere. The reaction is continued at 120° C. until an acid value of below 5 mg KOH/g of solid resin is achieved. The mixture is then diluted with 533 parts of pentaerythritol triacrylate.

Final values: Solids (1 h/150° C.): 98.7%; acid value at approx. 80% in pentaerythritol triacrylate: 3.5 mg KOH/g of solid resin.

PRODUCTION EXAMPLE 3

Production of a Polyketimine (component D)

320 parts of 2-methylpentane-1,5-diamine, 1600 parts of methyl isobutyl ketone and 1000 parts of xylene are introduced under an inert gas atmosphere into a 4 liter three-necked flask fitted with a reflux condenser, stirrer, thermometer and distillation bridge. The mixture is heated while being stirred until water of reaction is driven off (from approximately 98° C.). The mixture is stirred until no further water is eliminated (98.2 parts of water, equal to 97.7% of theoretical). The polyketimine solution obtained is evaporated under a vacuum until a theoretical solids content (related to ketimine) of 80% is achieved. The solution obtained then has a colour value of 50 Hazen.

EXAMPLE 4

Production of a thin layer filler:

| | wt. % |
|---|---|
| Polyester from example 1b) | 15.0 |
| Commercial polyester acrylate (component B) | 10.0 |
| Wetting & dispersing agent | 3.0 |
| Pyrogenic silicon dioxide | 0.5 |
| Titanium dioxide | 7.0 |

-continued

| | wt. % |
|---|---|
| Talc | 20.2 |
| 2-hydroxy-2-methyl-1-phenylpropan-1-one (photoinitiator) | 4.0 |
| Ketimine from example 3 | 7.0 |
| Pentaerythritol triacrylate | 6.0 |
| Diazabicyclooctane | 0.3 |
| Benzyl acrylate | 10.0 |
| Phenoxyethyl acrylate | 6.0 |
| n-hexyl acrylate | 11.0 |
| | 100.0 |

EXAMPLE 5

Production of surfacing compound containing no styrene

| | wt. % |
|---|---|
| Acetoacetic ester functionalised polyester (1b) | 18.0 |
| Unsaturated polyester resin (2b) | 8.6 |
| 1:1 mixture of two commercial photoinitiators (benzil-dimethylketal/2-hydroxy-2-methyl-1-phenyl-propan-1-one) | 3.8 |
| Ketimine from example 3 | 4.6 |
| Dipropylene glycol diacrylate (DPGDA) | 6.0 |
| Isobornyl acrylate (IBA) | 10.7 |
| Pentaerythritol triacrylate (PETA) | 6.0 |
| Talc | 42.0 |
| Diazabicycloundecene | 0.3 |
| | 100.0 |

The mixture described in example 4 is applied with a spray gun (1.3 mm jet, 5 bar) and cured by 10 minutes' irradiation with Hönle type 250 hand lamp (distance 20 cm). Layer thickness is approximately 150 μm.

A 1 cm deep indentation (approximately 1.5 cm³) was filled with the formulation described in example 5 using a spatula. The surface (approximately 2 mm) was cured by 10 minutes' irradiation with a Hönle type 250 hand lamp (distance 20 cm). The entire formulation then thoroughly cures overnight.

We claim:

1. Coating composition comprising (A) 10–80 wt. % of one or more compounds with on average at least two CH-acid hydrogen atoms, (B) 10–80 wt. % of one or more α,β-unsaturated compounds with at least two identical or different groups of the general formula

$$R_1R_2C=CR_3-CO-$$

which are linked together by the residue of a di- or polyhydric alcohol, a di- or polyamine or aminoalcohol, in which $R_1$, $R_2$ and $R_3$ are mutually and independently a hydrogen atom or a straight or branched alkyl or alkenyl residue with 1 to 10 carbon atoms, or a substituted form of the residue wherein the substituent is one or more hydroxyl groups, (C) 0–50 wt. % of one or more radically or ionically polymerisable compounds, (D) 5–50 wt. % of one or more polyamines with at least two amine functional groups per molecule, related to the sum of the weights of A), B), and C, which groups are primary or secondary or both, and which groups are entirely or partially capped or uncapped, (E) 0.01–5 wt. %, related to the sum of the weights of components A), B), C) and D) of a catalyst in the form of one or more Lewis or Brønsted bases, wherein the conjugate acids of the latter have a pKA value of at least 10, (F) 0.1 to 10 wt. %, related to the sum of the weights of components A), B), C) and D) of one or more photo-initiators.

2. A coating composition according to claim 1 comprising a crosslinking agent component A) with on average at least 2 CH-acid hydrogen atoms which originate from one or more of the following groupings, which may be the same or different:

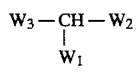

in which

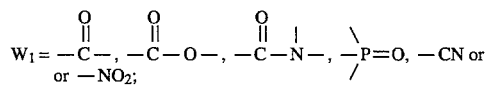

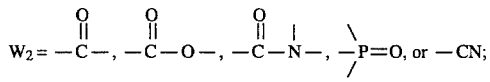

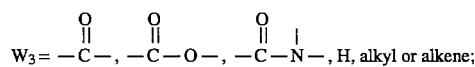

wherein the

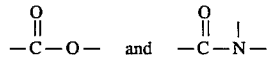

are each bonded to the CH group via the carbon atom and the CH group is bonded via at least one of the residues $W_1$, $W_2$ and/or $W_3$ to a polymeric or oligomeric unit.

3. A coating composition according to claim 1, comprising the composition in solvent-free form.

4. A coating composition according to claim 1, comprising the composition in a form containing solvent.

5. A coating composition according to claim 1, comprising the composition in the form of an aqueous solution.

6. A coating composition according to claim 1, comprising the composition containing one or more sensitisers.

7. A coating composition according to claim 1, comprising the composition in the form of a filler or surfacing compound containing pigments and/or extenders.

8. A process for the production of a coating, comprising applying a coating composition according to claim 1 to a substrate to be coated, curing the surface of the film obtained with high-energy radiation, and allowing the deeper layers to cure thoroughly at room temperature or with heating.

9. A method for use of a coating composition according to claim 1, comprising producing the coating with a rapidly curing surface.

10. A method for use of a coating composition according to claim 1, comprising applying the composition as a filler or surfacing compound.

11. A method for use of a coating composition according to claim 1, comprising applying the composition as a filler layer in a multi-layer lacquer coating.

12. A method for use of a coating composition formulation according to claim 1, comprising applying the composition as a filler layer or a surfacing compound in the lacquer coating of a motor vehicle or motor vehicle component.

13. A coating composition according to claim 1 wherein component F contains one or more of a pigment, an extender, a thixotropic agent, a smoothing agent, a flattening agent, a flow-control agent, an organic solvent, or water.

* * * * *

UNITED STATES PATENT AND TRADEMARK OFFICE
CERTIFICATE OF CORRECTION

PATENT NO.   : 5,453,449

DATED        : September 26, 1995

INVENTOR(S)  : Drüeke et al.

It is certified that error appears in the above-identified patent and that said Letters Patent is hereby corrected as shown below:

Title Page, item 73, Assignee, "BeschGankter" should be --Beschränkter--.

Column 5, line 62, insert --2-- after the word "particular".

Signed and Sealed this

Thirteenth Day of February, 1996

Attest:

BRUCE LEHMAN

Attesting Officer    Commissioner of Patents and Trademarks